United States

Sugiyama

[11] 3,795,437
[45] Mar. 5, 1974

[54] PHOTOGRAPHIC OBJECTIVE OF RELATIVELY NARROW VIEWING ANGLE

[75] Inventor: Takahiro Sugiyama, Tokyo, Japan

[73] Assignee: Asahi Kogahu Kogyo Kabushiki Kaisha, Tokyo, Japan

[22] Filed: May 18, 1972

[21] Appl. No.: 254,423

[30] Foreign Application Priority Data
May 24, 1971 Japan.................................. 46-35397

[52] U.S. Cl................................. 350/218, 350/176
[51] Int. Cl. ............................................. G02b 9/60
[58] Field of Search............................ 350/218, 176

[56] References Cited
UNITED STATES PATENTS
2,683,396   7/1954   Klemt et al. ......................... 350/218
3,506,341   4/1970   Kazamaki et al. .................. 350/218

FOREIGN PATENTS OR APPLICATIONS
13,043   9/1962   Japan.................................. 350/218

Primary Examiner—John K. Corbin
Attorney, Agent, or Firm—Steinberg & Blake

[57] ABSTRACT

A photographic objective having a relatively narrow viewing angle. The length of the objective is relatively great. In order to achieve a small Petzval sum and the relatively narrow angle, the dimension $d_2$ of the space along the principal axis between the second and third lenses is relatively great.

1 Claim, 5 Drawing Figures

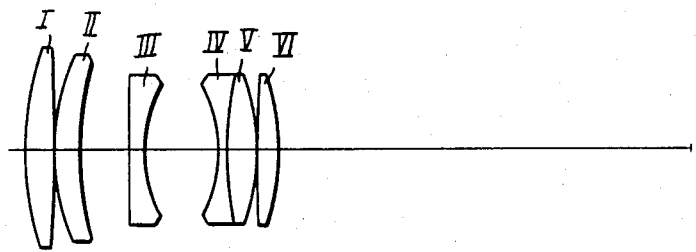
Fig. 1
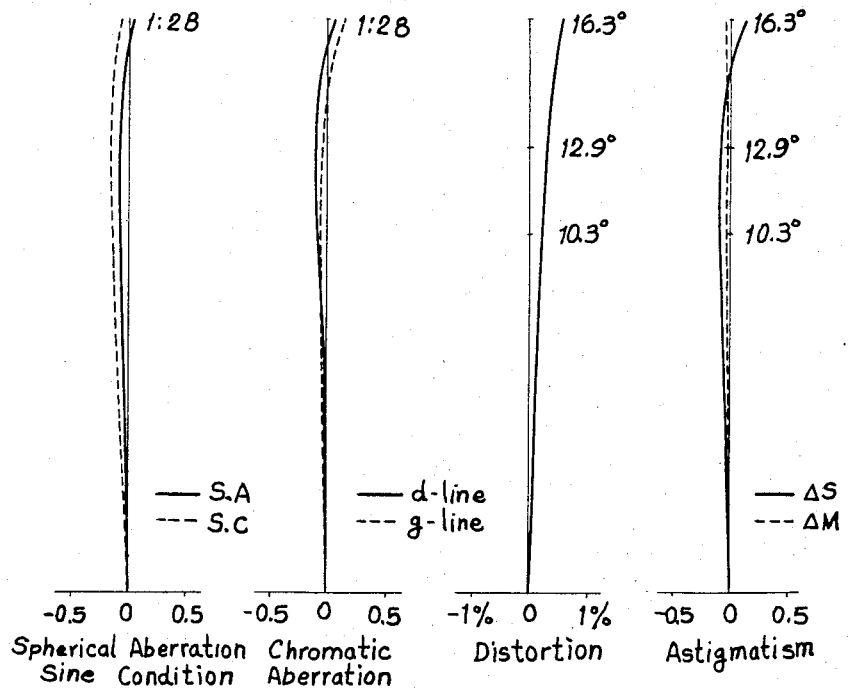

PHOTOGRAPHIC OBJECTIVE OF RELATIVELY NARROW VIEWING ANGLE

BACKGROUND OF THE INVENTION

The present invention relates to photographic objectives.

In particular, the present invention relates to photographic objectives of relatively narrow viewing angle.

Where objectives have a focal length greater than 100 mm and an f number exceeding 1:2.8, glass of a high index of refraction and small divergence results in an undesirably high cost. In view of these considerations, if the cost of the glass is limited it is of advantage to use a glass having a lower index of refraction. However, if the Petzval sum is increased or the objective is generally used, the above defect may cause an undesirable increase in flare.

SUMMARY OF THE INVENTION

It is accordingly a primary object of the present invention to provide a photographic objective of relatively narrow viewing angle which will avoid the above drawbacks.

In particular, it is an object of the present invention to provide a photographic objective of relatively narrow viewing angle having a relatively small Petzval sum.

Also, it is an object of the present invention to provide a photographic objective of this type which will not suffer from excessive spherical aberration, coma aberration, or chromatic aberration.

Yet another object of the present invention is to provide a limitation of the length of the objective without undesirably decreasing the amount of peripheral light and without creating difficulties with respect to correction of coma aberration, while at the same time maintaining the Petzval sum relatively low, without increasing the amount of light undesirably.

Thus, it is an object of the invention to provide a photographic objective of the above general type which is capable of providing excellent correction of aberrations while at the same time achieving the desired relatively narrow angle.

According to the invention the photographic objective is composed of six lenses designated I–VI wherein lenses IV and V are cemented together, with the objective having the data of Table 1, set forth below, for a focal length of 100 mm for the entire lens system.

BRIEF DESCRIPTION OF DRAWINGS

The invention is illustrated by way of example in the accompanying drawings which form part of this application and in which:

FIG. 1 is a representation of a photographic objective according to the invention wherein the lenses are designated I–VI from front to rear; and FIGS. 2A–2D are a plurality of graphs respectively illustrating the manner in which various defects are corrected with the objective of the invention.

DESCRIPTION OF A PREFERRED EMBODIMENT

Where a photographic objective has a relatively narrow viewing angle, although the peripheral amount of light is lost somewhat more abruptly relative to the viewing angle than is the case with what is generally considered a standard objective (haviang an image angle of approximately 46°), in the actual image the loss of the amount of light is generally not felt. On the other hand, in designing objectives of this type it is desirable to provide a small Petzval sum. Considering these two factors, there is provided in accordance with the present invention a distance between the second and third lenses which is relatively great. Thus, the length of the entire objective is relatively long.

Where an objective has a focal length greater than 100 mm and an f number exceeding 1:2.8, glass of high index of refraction and small divergence generally increases the cost. In view of this factor, if the cost of the glass is limited, a glass of a lower index of refraction is of greater advantage. However, if the Petzval sum is increased or the objective is used generally, these defects are likely to cause an increase in flare. In accordance with the present invention, however, this defect is eliminated by enlarging the space between the second and third lenses of the objective.

Referring to FIG. 1, lens I is a positive type of lens. Lens II is a positive meniscus type of lens. Lens III is a negative meniscus type of lens. Lens IV is a negative lens and is cemented to lens V, with the surface of greater curvature of lens IV being directed toward the front, which is to say toward lens I. Lens V is a double convex type of lens. Lens VI is a positive meniscus type of lens.

The objective of the invention is characterized by the following conditions:

1. $1.57 < (n_1 + n_2) / 2 < 1.65$
2. $57 < (v_1 + v_2) / 2$
3. $F / 1.2 < F_1 < F / 0.9$
4. $0.08 F < d_2 < 0.12 F$
5. $F / 1.9 < F_{1.2} < F / 1.7$
6. $0.22 F < (t_2 + d_2 + t_3) < 0.26 F$
7. $0.08 < (n_5 - n_4) < 0.14$
8. $F / 0.1 < F_{1.2.3.4.5} < F / 0.01$
9. $1.78 < n_6$ where $F$ is the resultant focal length of the entire lens system;

$F_{1.2 \ldots i}$ is the resultant focal length of the lens group consisting of the first to the $i$-th lens;

$t_k$ is the lens thickness of the $k$-th lens $d_k$ is the $k$-th space between the successive lenses;

$n_i$ is the index of refraction, on the $d$-line, of the $i$-th lens; and $v_i$ is the Abbe number of the $i$-th lens.

Conditions (1) and (2) limit the chromatic aberration in the front lens group and at the same time balance various aberrations. Condition (1) constitutes an important feature of the invention together with conditions (4) and (5) by determining the Petzval sum. According to the value $v$ of condition (2), the focal length of the lens group up to the second lens of condition (5) and the lens spacing of condition (4), the glass material of lens III is determined and the resulting chromatic aberration is determined so as to decrease the Petzval sum. If the value $v$ is below that of condition (2), it is desirable that the range of conditions (5) and (4) be exceeded.

Condition (3) determines the focal length of lens I and further determines the focal length of lens II in conjunction with condition (5). Condition (3) is characterized in that it decreases the load on the lens II to a great degree. Accordingly, the photographic objective of the invention may be constructed with small spherical aberration and coma aberration. If the focal length is so short as to exceed the lower limit of conditions (3) and (5), then aggravation of chromatic aberration will become conspicuous and the Petzval sum will be decreased too much so that it will be difficult to retain the desired image angle. On the other hand, if the upper limit is exceeded, then an undesirable condition will result in that the Petzval sum will be increased and astigmatism will also increase.

Condition (4) is related to conditions (3) and (5). In designing an objective of relatively narrow angle, it is desirable to make $d_2$ relatively long so as to decrease the Petzval sum. However, such a great value as to exceed 0.12 F will cause aggravation of chromatic aberration in conjunction with conditions (2) and (5) and thus such a great value is not desirable. On the other hand, if the value of the distance $d_2$ between lenses II and III is smaller than 0.08 F, it will not be possible to achieve the desired relatively narrow viewing angle.

Condition (6) represents a further feature according to the present invention. Limitation to a certain length is advantageous for retaining the desired relatively narrow viewing angle for the objective of the invention. If the length is too great, however, the peripheral light amount will be undesirably decreased. Using a larger rear group of lenses to compensate for this factor would make correction of coma aberration difficult, so that the particular size set forth in condition (6) is suitable for these various factors. If a shorter length of adopted, then the increase in the Petzval sum and in the amount of light would be too great to retain the desired characteristics of the objective of the invention.

Condition (7) will correct coma aberration and also serves, together with the above conditions to decrease the Petzval sum. Thus, this condition contributes to correction of coma aberration of light rays which have a relatively low incidence height with light bundles having relatively large angles of incidence. If the valve 0.14 of condition (7) is exceeded, the opposite result is produced, while if the value is smaller than 0.08, the result is too small. This feature is related to the refractive abilities of both the sixth surface and the eighth surface.

Conditions (8) and (9) indicate the excellent correction of aberration with respect to the resultant focal length of the lens group I–V, in conjunction with condition (9). Condition (8) is used in the case where astigmatism is corrected by condition (6). When the lower limit of condition (6) is not satisfied, then with respect to condition (8) a focal length shorter than F / 0.1 must be used so as to increase the negative coefficient of the term of astigmatism produced by the 10th surface. When a focal length longer than F / 0.01 is used it is advantageous that the curvature of the 10th surface approach a negative value, while there is a possibility that the spherical aberration of the eleventh surface is still not satisfactory under condition (9) so that it is suitable to satisfy condition (8) in conjunction with condition (6). Without condition (6) the conditions would be unsatisfactory as in the case of those for an objective having a brightness of over 1 : 2.8.

An example of the invention is set forth with respect to lens data in Table 1 below and with respect to von Seidel conditions in Table 2 below.

In the following Table 1, the data is presented for a focal length of 100 mm for the entire lens system, with the radii of curvature for the successive lens surfaces being designated by the corresponding subscripts according to the sequence of the particular surface in the entire lens system. Thus it will be noted that $R_8$ represents the radius of curvature for the common surface between the cemented lenses IV and V. The refractive indexes $n$ are with respect to the d-line, while the thicknesses of the several lenses along the principal axis are designated by $t$ with the subscripts according to the successive lenses and the spacing between the successive lenses is designated by $d$ with the corresponding subscript according to the sequence of the spaces between the successive lenses.

TABLE 1

| Lens | F = 100 mm. | | Glass constants | |
|---|---|---|---|---|
| | | | $n$ | $v$ |
| I | $R_1 = +52.000$ mm. | $t_1 = 4.670$ mm. | 1.62041 | 60.3 |
| | $R_2 = +1294.944$ mm. | $d_1 = 0.100$ mm. | | |
| II | $R_3 = +36.894$ mm. | $t_2 = 4.670$ mm. | 1.58913 | 61.2 |
| | $R_4 = +59.333$ mm. | $d_2 = 8.670$ mm. | | |
| | $R_5 = +1310.948$ mm. | | | |
| III | $R_6 = +27.500$ mm. | $t_3 = 2.670$ mm. | 1.67270 | 32.2 |
| | | $d_3 = 13.330$ mm. | | |
| IV | $R_7 = -29.467$ mm. | $t_4 = 1.470$ mm. | 1.58144 | 40.8 |
| V | $R_8 = +71.183$ mm. | $t_5 = 5.330$ mm. | 1.69350 | 50.7 |
| | $R_9 = -43.840$ mm. | $d_4 = 0.100$ mm. | | |
| VI | $R_{10} = -1480.821$ mm. | $t_6 = 3.330$ mm. | 1.80610 | 40.7 |
| | $R_{11} = -59.120$ mm. | | | |

$F_1 = 87.197$ mm.
$F_{1.2} = 55.320$ mm.
$F_{1.2.3.4.5} = 2024.220$ mm.

The following Table 2 sets forth the five von Seidel conditions for the successive lens surfaces which are designated in sequence in the first column, with the sum at the bottom of the columns indicated in the several von Seidel coefficients.

TABLE 2
von Seidel Coefficients

| Surface | $S_1$ | $S_2$ | $S_3$ | $P$ | $S_5$ |
|---|---|---|---|---|---|
| 1 | +1.674 | +0.872 | +0.454 | +0.735 | +0.619 |
| 2 | +0.766 | −0.718 | +0.673 | −0.030 | −0.603 |
| 3 | −0.171 | −0.127 | −0.093 | +1.004 | +0.672 |
| 4 | +0.065 | −0.230 | +0.809 | −0.624 | −0.650 |
| 5 | −2.560 | +1.495 | −0.874 | +0.031 | +0.492 |
| 6 | −2.123 | −1.753 | −1.447 | −1.461 | −2.401 |
| 7 | −2.513 | +0.224 | −0.020 | −1.246 | +0.113 |
| 8 | +0.521 | +0.551 | +0.582 | +0.059 | +0.677 |
| 9 | +0.917 | −0.194 | +0.041 | +0.933 | −0.207 |
| 10 | +0.000 | +0.004 | −0.058 | −0.030 | +1.184 |
| 11 | +3.600 | +0.048 | +0.001 | +0.754 | +0.010 |
| SUM | +0.176 | +0.173 | +0.067 | +0.125 | −0.092 |

Referring to FIGS. 2A–2D, the extremely small extent of optical defects resulting with the objective of the invention is immediately apparent. In FIG. 2A is an indication of spherical abberation and sine condition, and it will be seen that these defects are of an extremely small order.

With respect to the graph of chromatic aberration in FIG. 2B, it is also apparent that there is hardly any perceptible chromatic aberration with respect to the $d$-line and $g$-line as indicated. The distortion represented in the graph FIG. 2C also is of an extremely small order, while astigmatism, as represented in the graph of FIG. 2D, is also of an extremely low degree.

What is claimed is:

1. A photographic objective having six lenses designated I–VI from front to rear with lenses IV and V cemented together and having a common surface of radius $R_8$, wherein the objective has the following data:

| Lens | F = 100 mm. | | Glass constants | |
|---|---|---|---|---|
| | | | $n$ | $v$ |
| I | $R_1 = +52.000$ mm. | $t_1 = 4.670$ mm. | 1.62041 | 60.3 |
| | $R_2 = +1294.944$ mm. | $d_1 = 0.100$ mm. | | |
| II | $R_3 = +36.894$ mm. | $t_2 = 4.670$ mm. | 1.58913 | 61.2 |
| | $R_4 = +59.333$ mm. | $d_2 = 8.670$ mm. | | |
| III | $R_5 = +1310.948$ mm. | $t_3 = 2.670$ mm. | 1.67270 | 32.2 |
| | $R_6 = +27.500$ mm. | $d_3 = 13.330$ mm. | | |
| | $R_7 = -29.467$ mm. | | | |
| IV | $R_8 = +71.183$ mm. | $t_4 = 1.470$ mm. | 1.58144 | 40.8 |
| V | $R_9 = -43.840$ mm. | $t_5 = 5.330$ mm. | 1.69350 | 50.7 |
| | $R_{10} = -1480.821$ mm. | $d_4 = 0.100$ mm. | | |
| VI | $R_{11} = -59.120$ mm. | $t_6 = 3.330$ mm. | 1.80610 | 40.7 |

$F_1 = 87.197$ mm.
$F_{1.2} = 55.320$ mm.
$F_{1.2.3.4.5} = 2024.220$ mm.

where F is the focal length for the entire lens system, $R_1 - R_{11}$ are the radii of curvature for the successive lens surfaces designated by the corresponding subscripts according to the sequence of the surfaces in the lens system, $n$ represent the refractive indexes with respect to the $d$-line, the thicknesses of the several lenses along the principal axis being designated by $t$ with the subscripts according to the successive lenses, and the spacing between the successive lenses being designated by $d$ with the corresponding subscripts according to the sequence of the spaces between the successive lenses.

* * * * *